United States Patent [19]

Matsuo et al.

[11] Patent Number: 4,792,354

[45] Date of Patent: Dec. 20, 1988

[54] WATER AND OIL REPELLENT HAVING EXCELLENT DESOILING PROPERTIES

[75] Inventors: Masashi Matsuo; Masayuki Tamura, both of Yokohama, Japan

[73] Assignee: Asahi Glass Company Ltd., Tokyo, Japan

[21] Appl. No.: 11,241

[22] Filed: Feb. 5, 1987

[30] Foreign Application Priority Data

Feb. 5, 1986 [JP] Japan ............................................. 61

[51] Int. Cl.[4] .............................................. C09K 3/18
[52] U.S. Cl. ........................................ 106/2; 528/70; 560/25; 560/167
[58] Field of Search ............................ 106/2; 252/8.6; 560/167, 25; 528/70

[56] References Cited

U.S. PATENT DOCUMENTS

| | | | |
|---|---|---|---|
| 3,901,727 | 8/1975 | Loudas | 106/2 |
| 3,920,614 | 11/1975 | Kirimoto et al. | 526/245 |
| 3,975,352 | 8/1976 | Yoerger et al. | 106/2 |
| 4,158,672 | 6/1979 | Dear et al. | 560/100 |
| 4,595,518 | 6/1986 | Raynolds et al. | 252/8.6 |
| 4,617,057 | 10/1986 | Plueddemann | 106/2 |
| 4,681,790 | 7/1987 | Fong | 106/2 |

*Primary Examiner*—Paul Lieberman
*Assistant Examiner*—Willie J. Thompson
*Attorney, Agent, or Firm*—Oblon, Fisher, Spivak, McClelland & Maier

[57] ABSTRACT

A water and oil repellent having excellent desoiling properties composed of a compound comprising at least two terminal segments and an intermediate segment connecting the terminal segments and having a molecular weight of from 800 to 20,000, each terminal segment containing at least one polyfluoroalkyl group connected by a —CONH— linking group, said intermediate segment being a urethane oligomer containing at least two —CONH— linking groups and a hydrophilic molecular chain, and said terminal segments and intermediate segment being connected by a —CONH— linking group.

1 Claim, No Drawings

WATER AND OIL REPELLENT HAVING EXCELLENT DESOILING PROPERTIES

The present invention relates to a water and oil repellant composed of a certain specific compound containing polyfluoroalkyl groups, which is capable of providing excellent desoiling properties compatibly with high water and oil repellency.

Generally, a fluorine-containing compound having polyfluoroalkyl groups has been known as a water and oil repellant. It has been known that fibrous fabrics treated with such a fluorine-containing compound has water and oil repellency so that stains hardly adhere thereto. However, it is well-known that if water repellency is intensified by such a fluorine-containing compound, a detergent does not work effectively when fibers are washed with water or the like, whereby stains once adhered to the fibers can hardly be removed, and in an extreme case the water and oil repellency tends to deteriorate.

On the other hand, water and oil repellent treating agents endowed with desoiling properties are already known which are obtained by a reaction or a copolymerization of a hydrophilic group-containing compound with a fluorine-containing compound. It has been believed that these treating agents facilitate the action of the detergent and release of stains during the washing operation. See, Japanese Examined Patent Publications No. 35033/1977, No. 43955/1977 and No. 18192/1978 and U.S. Pat. Nos. 3,574,791, 3,728,151 and 3,920,614. However, fibrous fabrics treated with such treating agents endowed with desoiling properties have not only a problem such that they can hardly exhibit adequate water repellecy but also a problem such that dusts and aqueous stains tend to adhere thereto.

It is an object of the present invention to provide a water and oil repellent treating agent having excellent desoiling properties such that stains once adhered will readily be removed by a washing as well as high water and oil repellency such that stains will hardly adhere thereto. Namely, the present invention is intended to provide a water and oil repellant which is capable of providing excellent desoiling properties compatibly with high water and oil repellency.

The present inventors have conducted various studies and researches on the conventional fluorine-containing urethane type water and oil repellants, and as a result, have made the following interesting discoveries. Namely, it has been found that a compound obtained by connecting at least two molecules of a polyfluoroalkyl group-containing urethane compound by a certain specific hydrophilic molecular chain-containing urethane oligomer type molecular chain and having a molecular weight within a certain specific range, is capable of providing excellent desoiling properties without impairing other properties such as water and oil repellency and stain-proofing properties. For instance, a polyfunctional isocyanate compound is reacted with e.g. a polyfluoroalkyl group-containing alcohol to obtain a urethane compound containing a polyfluoroalkyl group and an isocyanate group, and the isocyanate group of the urethane compound is reacted with a hydrophilic molecular chain-containing urethane oligomer compound having active hydrogens at its both ends to obtain a compound having a terminal group of a polyfluoroalkyl group-containing urethane compound bonded by a —CONH— linking group at each end of the urethane oligomer type molecular chain. Such a compound having a specific intermediate linking molecular chain is capable of providing excellent desoiling properties compatibly with high water and oil repellency as compared with conventional fluorine-containing urethane compounds having no such an intermediate linking molecular chain. Further, when the intermediate linking molecular chain is an oxyalkylene molecular chain without —CONH— linking groups as disclosed in e.g. Examples of Japanese Examined Patent Publication No. 43955/1977 or U.S. Pat. No. 3,574,791, some difficulties such that dusts and aqueous stains tend to adhere, have been observed. Whereas, with the hydrophilic molecular chain-containing urethane oligomer type molecular chain having at least two —NHCO— linking groups in the molecule according to the above discovery, excellent desoiling properties as well as extremely high level of water and oil repellency can be obtained.

Thus, the present invention has been accomplished on the basis of the above discoveries, and provides a water and oil repellant having excellent desoiling properties composed of a compound comprising at least two terminal segments and an intermediate segment connecting the terminal segments and having a molecular weight of from 800 to 20,000, each terminal segment containing at least one polyfluoroalkyl group connected by a —CONH— linking group, said intermediate segment being a urethane oligomer containing at least two —CONH— linking groups and a hydrophilic molecular chain, and said terminal segments and intermediate segment being connected by a —CONH— linking group.

Now, the present invention will be described in detail with reference to the preferred embodiments.

In the present invention, it is important that the water and oil repellant is composed of a compound comprising the specific terminal segments and the specific intermediate segment. Each of such segments can be obtained by a reaction of an isocyanate group-containing compound with an active hydrogen group-containing compound. Further, it is important that the specific terminal segments and the specific intermediate segment are connected by —CONH— linking groups. This connection is formed by a reaction of the isocyanate group and the active hydrogen group. Accordingly, each specific terminal segment contains a polyfluoroalkyl group connected by a —CONH— linking group, and the specific intermediate segment is made of a urethane oligomer containing at least two —CONH— linking groups and a hydrophilic molecular chain. It is important that at least two such specific terminal segments are connected to the specific intermediate segment by —CONH— linking groups.

The compound of the present invention having the above-mentioned construction and a molecular weight of from 800 to 20,000, can be prepared by various synthetic routes. Usually, however, the specific compound of the present invention can be obtained by preparing the specific terminal segment compound and the specific intermediate segment compound so that one of the segments have an isocyanate group and the other segment has an active hydrogen group, and then reacting the two segment compounds. It is preferred to employ a method wherein a polyfunctional isocyanate compound is reacted with an active hydrogen compound having a polyfluoroalkyl group, if necessary further with another active hydrogen compound, to form a polyfluoroalkyl goup-containing isocyanate having at least one —NCO group (i.e. the terminal segment member), then a hydrophilic molecular chain-containing polyvalent active hydrogen compound is reacted with a polyfunctional isocyanate compound to form a hydrophilic molecular chain-containing urethane oligomer having at least two active hydrogen groups (i.e. the intermediate segment member), and the two segment members are connected by the reaction of the isocyanate group with the active hydrogen group. Otherwise, it is possible to employ a method wherein a polyfluoroalkyl group-containing isocyanate as mentioned above (i.e. the terminal segment member) is reacted with a hydrophilic molecular chain-containing polyvalent active hydrogen compound and a polyfunctional isocyanate compound so that the formation of the intermediate segment member and the connection of the two segments are conducted in one reaction system. Likewise, it is possible to employ a method wherein the above-mentioned intermediate segment member is reacted with a polyfluoroalkyl group-containing active hydrogen compound and a polyfunctional isocyanate compound so that the formation of the above-mentioned terminal segment member and the connection of the two segment members are conducted in one reaction system. It is of course permissible to react the starting material compounds used for the preparation of the above-mentioned two segment members all together so that the formation of the respective segment members and the connection of the two segment members are conducted in one reaction system, so long as it is thereby possible to obtain a compound having the specific structure and molecular weight according to the present invention.

In addition, in the present invention, it is possible to employ a method wherein, contrary to the above-mentioned preferred manner of synthesis, at least one active hydrogen group is left in the terminal segment member, and at least two —NCO groups are left in the intermediate segment member, and the two segment members are reated with each other. Likewise, it is possible to employ a method wherein active hydrogen groups are left in both segment members, and such segment members are connected by a polyfunctional isocyanate compound. Likewise, it is possible to employ a method wherein isocyanate groups are left in both segment members, and such segment members are connected by a polyvalent active hydrogen compound.

Further, for the formation of the intermediate segment member in the present invention, a hydrophilic molecular chain-containing monovalent active hydrogen compound, a polyvalent active hydrogen compound such as 1,6-hexamethylene glycol and a polyfunctional isocyanate compound, are reacted to form a urethane oligomer type intermediate segment member having at least two —CONH— linking groups and a hydrophilic molecular chain.

The compound having the specific structure and molecular weight of the present invention can be prepared by various synthetic routes as described above. Now, specific manners for the preparation will be described as typical examples for the above-mentioned preferred embodiments.

As the polyfunctional isocyanate compound which may be employed for the formation of the specific terminal segment and intermediate segment according to the present invention, various compounds may be employed without any particular restrictions, so long as they are bifunctional or higher functional. For instance, there may be mentioned bifunctional isocyanate compounds including aromatic isocyanates such as 2,4-tolylenediisocyanate, 4,4'-diphenylmethanediisocyanate, tolidinediisocyanate and dianisidinediisocyanate; alicyclic diisocyanates such as 2-methyl-cyclohexane-1,4-diisocyanate, isophoronediisocyanate and hydrogenated MDI

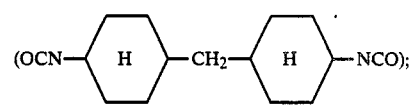

and aliphatic diisocyanates such as hexamethylenediisocyanate and decamethylenediisocyanate. These compounds may be represented by the formula OCN—Y—NCO. When two OCN—Y—NCO are reacted in the presence of water, a dimer of the formula OCN—Y—NHCONH—Y—NCO will be formed. The bifunctional isocyanate compounds include such a dimer. In addition to the bifunctional isocyanate compounds, polyfunctional isocyanate compounds such as trifunctional, tetrafunctional or pentafunctional isocyanate compounds may be mentioned. Specific examples of trifunctional isocyanate compounds include, in addition to the after-mentioned compounds, a trimer of the formula

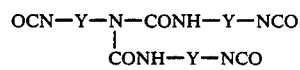

obtained by reacting the above-mentioned dimer of the formula OCN—Y—NHCONH—Y—NCO with a monomer of the formula OCN—Y—NCO, and a tetramer of the formula

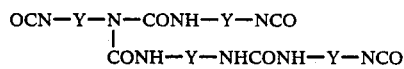

obtained by reacting two dimers and having three-NCO groups. Examples of other three functional isocyanate compounds include:

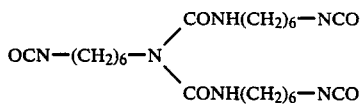

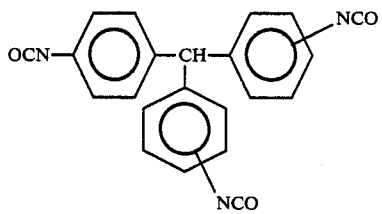

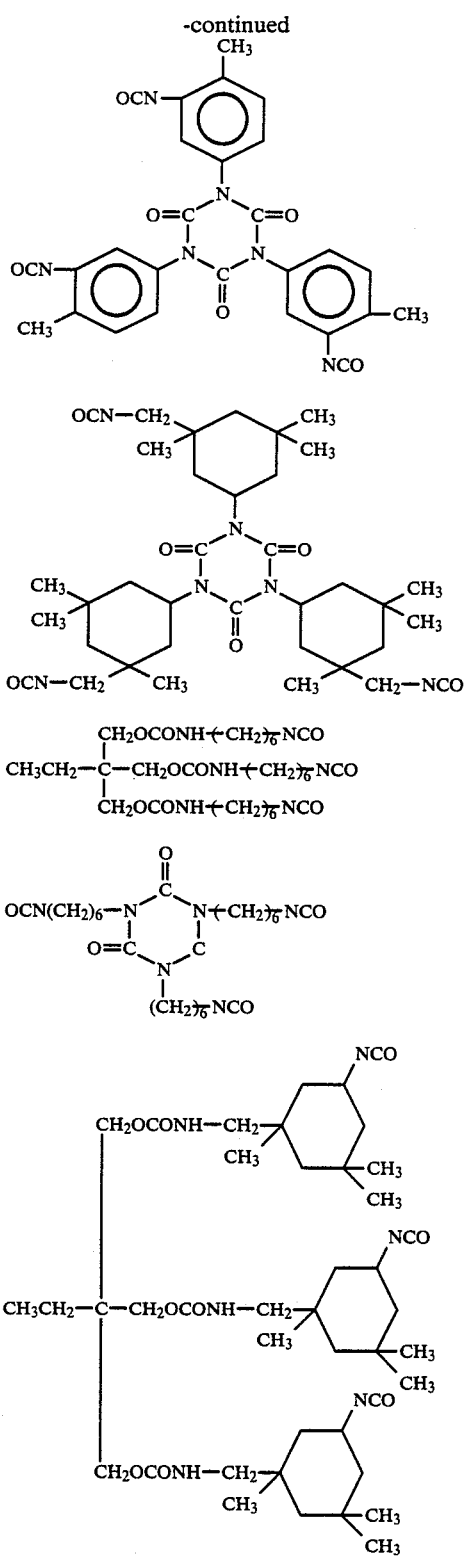

In the present invention, for the formation of the specific terminal segment, it is preferred to employ a trifunctional isocyanate compound among the above-mentioned polyfunctional isocyanate compounds. Particularly preferred is an aliphatic trifunctional isocyanate compound. On the other hand, as the polyfunctional isocyanate compound to be used for the formation of the specific intermediate segment, it is usually preferred to employ an aromatic polyfunctional isocyanate compound, particularly a bifunctional aromatic isocyanate compound, to obtain high water repellency and excellent stain-proofing properties. For the formation of the respective segments, it is of course possible to employ a combination of two or more polyfunctional isocyanate compounds different in the types, in the functionality or in the number of functional groups. Likewise, it is possible to employ a mixture of the above-mentioned preferred polyfunctional isocyanate compounds with isocyanate compounds having higher functionalities.

For the formation of the specific terminal segment, the polyfluoroalkyl group-containing active hydrogen compound to be used for the reaction with the above-mentioned polyfunctional isocyanate compound, includes compounds represented by the formula $R_f$—X—A—H. As such $R_f$—X—A—H, a fluorine-containing alcohol of $R_f$—R—OH type is preferably employed. Further, a fluorine-containing thioalcohol of $R_f$—R—SH type where A is —S—, may also be employed. Likewise, a fluorine-containing amine where A is —N($R^2$)—, may be employed. It is of course possible to employ, as a starting material, a mixture of fluorine-containing alcohols which are different from one another in the number of carbon atoms, in $R_f$ or in the type of R.

In the above formula, $R_f$ is usually a straight chain or branched polyfluoroalkyl group having from 1 to 20 carbon atoms, preferably from 4 to 16 carbon atoms. It is usual to employ a compound wherein the terminals are perfluoroalkyl groups. However, it is possible to employ a compound wherein the terminals contain hydrogen atoms or chlorine atoms, or oxyperfluoroalkylene-containing groups. A preferred example of $R_f$ is a perfluoroalkyl group of the formula $C_nF_{2n+1}$ wherein n is an integer of from 4 to 16. The perfluoroalkyl group wherein n is from 6 to 12 is particularly preferred. X is —R—, —CON($R^1$)—Q— or —SO$_2$N($R^1$)—Q— wherein R is a bivalent alkylene group, $R^1$ is a hydrogen atom or a lower alkyl group, and Q is a bivalent organic group. X is preferably a bivalent alkylene group having from 1 to 10 carbon atoms, particularly a bivalent alkylene group having from 2 to 4 carbon atoms. Q is a bivalent organic group. Usually, a bivalent alkylene group of —R— is mentioned as a preferred example.

In the present invention, if necessary, other active hydrogen compounds represented by the formula Z—$A^1$—H may be employed together with the $R_f$ group-containing active hydrogen compound such as $R_f$—X—A—H. As in the case of the above-mentioned $R_f$—X—A—H, Z—$A^1$—H includes an alcohol where $A^1$ is —O—, a thioalcohol where $A^1$ is —S—, and an amine where $A^1$ is —N($R^2$)—. For instance, the water repellency of the water and oil repellant of the present invention can further be improved by using a straight chain stearyl group-containing active hydrogen compound such as n—$C_{18}H_{37}$OH, n—$C_{18}H_{37}$SH or n—$C_{18}H_{37}$NH$_2$, as Z—$A^1$—H. Further, in order to further improve the durability by improving the affinity with the surface of e.g. synthetic fibers as the object to be treated, it is possible to employ an alcohol such as

as Z—A¹—H. Furthermore, it may be an alkanolamine, a diamine or a combination of ammonia with a methylol modifying agent.

In the above formulas $R_f$—X—A—H and Z—A¹—H, each of A and A¹ is —O—, —S— or —N(R²)— wherein R² is a hydrogen atom or a monovalent organic group. From the viewpoint of availability, those wherein A is —O—, or A¹ is —O— or —N(R²)— are preferably selected. Z is a monovalent organic group, which may be the same as the above-mentioned R², or may form a ring together with R². For instance, —A¹—Z includes —OR' (wherein R' is an alkyl group, etc.), —NHCH₂OH, —NHCH₂CH₂OH,

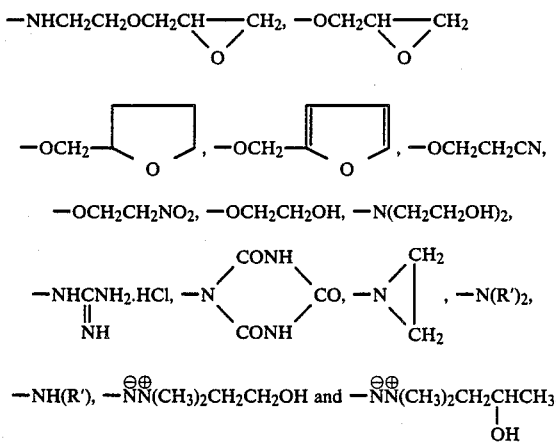

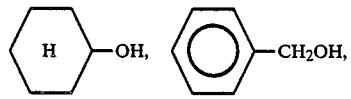

In the formula Z—A¹—H, Z is a monovalent organic group. As specific examples wherein X is an alkyl group, an aralkyl group or a alicyclic group, the following alcohols, thioalcohols or amines may be mentioned. CH₃(CH₂)$_q$OH, [CH₃(CH₂(CH₂)$_q$]₂CHOH, (CH₃)₃COH,

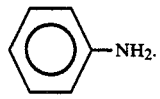

CH₃(CH₂)$_q$SH, [CH₃(CH₂)$_q$]₂CHSH, CH₃(CH₂)$_q$NH₂, [CH₃(CH₂)$_q$]₂NH and wherein q is an integer of from 0 to 30.

Next, as the hydrophilic molecular chain-containing polyvalent active hydrogen compound to be used for the reaction with the above-mentioned polyfunctional isocyanate compound for the formula of the specific intermediate segment, a compound containing at least two active hydrogen groups and at least one hydrophilic molecular chain, such as a polyhydric alcohols, a polyvalent thioalcohol or a polyvalent amine, may be mentioned. Usually, a polyoxyalkylene chain such as polyoxyethylene chain is preferably employed as a hydrophilic molecular chain. For instance, as a polyhydric alcohol containing a polyoxyalkylene chain, there may be mentioned a dihydric alcohol such as HO$\mathrm{-(-C_2H_4O-)_s}$H, HO$\mathrm{-(-C_2H_4O-)_t(C_3H_6O-)_u(C_2H_4O-)_p}$H,

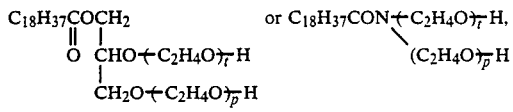

a trihydric alcohol such as

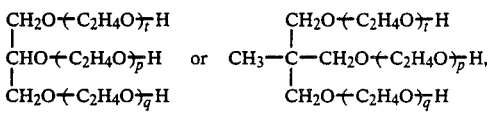

tetrahydric alcohol such as

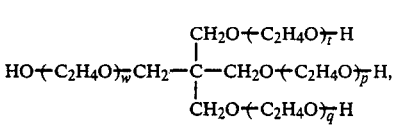

a pentahydric or higher hydric alcohol such as

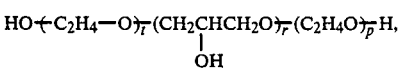

a partical alkyl or arylester, ether or amide thereof. Of course, these compounds may be used in combination as a mixture of two or more different kinds. In the above formulas, s is an integer of from 1 to 100, each of t, p, q, u and w is an integer of from 0 to 50 provided that all t, p, q, u and w are not 0 simultaneously, and r is an integer of from 3 to 50.

For the formation of the specific intermediate segment in the present invention, a polyol of the formula HO$\mathrm{-(-C_2H_4O-)_s}$H is preferably employed. One wherein s is an integer of 2 to 30 is particularly preferred. If the molecular weight of the hydrophilic molecular chain is too large, i.e. s is too large, the water repellency tends to be poor, or the water and oil repellent treating agent itself tends to be washed off during washing. Usually, a bifunctional polyvalent active hydrogen compound is preferred. If a trifunctional or higher functional polyvalent active hydrogen compound is used, gel is likely to form during the reaction, such being undesirable.

For the formation of the specific intermediate segment in the present invention, it is possible to employ a method wherein a monofunctional active hydrogen compound such as CH₃O$\mathrm{-(-C_2H_4O-)_s}$H, C₁₈H₃₇O$\mathrm{-(-C_2H_4O-)_s}$H, C₁₈H₃₇CO₂$\mathrm{-(-C_2H_4O-)_s}$H,

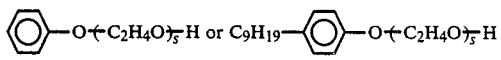

is employed for introduction of a hydrophilic molecular chain, and it is reacted with a trifunctional or higher functional isocyanates compound and a bifunctional or higher functional polyvalent active hydrogen compound. As the polyvalent active hydrogen compound in such a case, there may be employed as compound having at least two active hydrogen-containing groups such as a polyhydric alcohol, a polyvalent thioalcohol or a polyvalent amine. For instance, there may be mentioned a bifunctional polyvalent active hydrogen compound such as

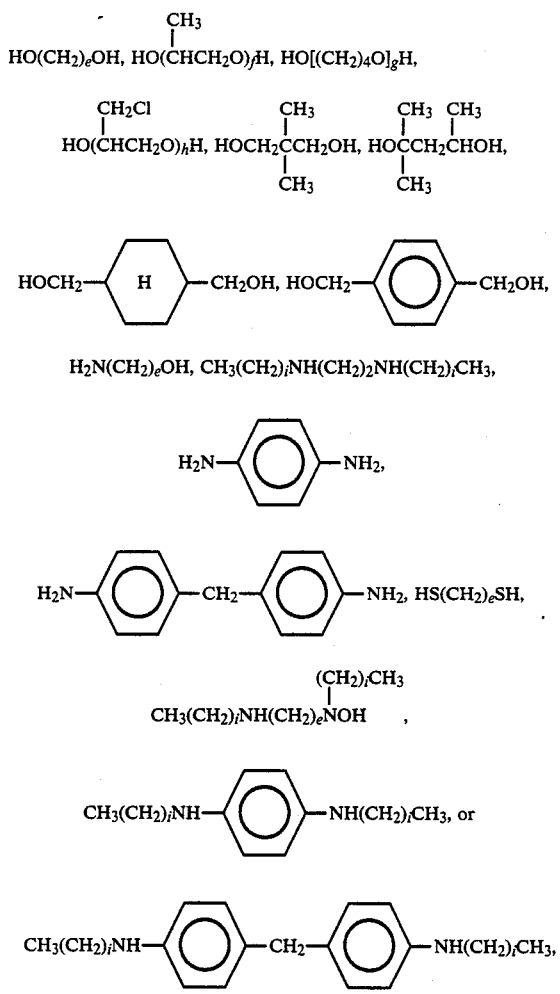

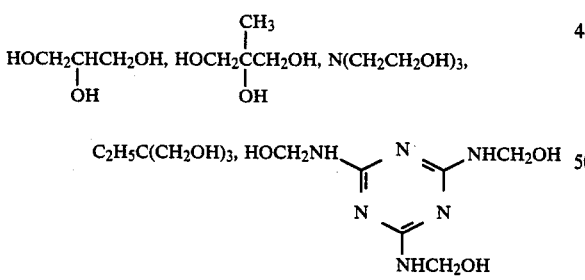

a trifunctional polyvalent active hydrogen compound such as

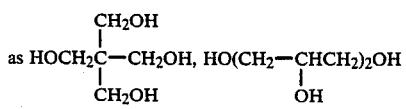

or $CH_3(CH_2)_iNH(CH_2)_2NH(CH_2)_2NH(CH_2)_iCH_3$, a tetrafunctional polyvalent active hydrogen compound such as $HOCH_2\underset{\underset{CH_2OH}{|}}{\overset{\overset{CH_2OH}{|}}{C}}-CH_2OH$, $HO(CH_2-\underset{\underset{OH}{|}}{CH}CH_2)_2OH$ or $CH_3(CH_2)_iNH(CH_2)_2NH(CH_2)_2NH(CH_2)_2NH(CH_2)_iCH_3$, a pentafunctional or higher functional polyvalent active hydrogen compound such as $HO(CH_2\underset{\underset{OH}{|}}{CH}CH_2)_3OH$, and partial alkyl or aryl esters, ethers or amides thereof. Of course, two or more of these compounds may be employed together in combination. In the above formulas, e is an integer of from 1 to 20, each of f, g and h is an integer of from 1 to 50, and i is an integer of from 0 to 20.

As is evident from the above-mentioned specific examples, the polyvalent active hydrogen compound to be used in combination with a hydrophilic molecular chain-containing monovalent active hydrogen compound may not necessarily contain a hydrophilic molecular chain.

In the present invention, the polyvalent active hydrogen compound to be used for the formation of the specific intermediate segment is preferably at most trifunctional. Particularly preferred is a bifunctional polyvalent active hydrogen compound. Such a polyvalent active hydrogen compound preferably has at least two methylene chains, particularly from 2 to 12 methylene chains, to obtain high water repellency, etc. When a tetrafunctional or higher functional polyvalent active hydrogen compound is employed, gel is likely to form during the reaction, such being undesirable.

In the present invention, the hydrophilic molecular chain-containing polyvalent active hydrogen compound to be used for the formation of the specific intermediate segment is preferably a compound represented by the formula H—$A^2$—B—$A^2$—H. In this formula, $A^2$, like the above-mentioned A or $A^1$, is —O—, —S— or —N($R^2$)— wherein $R^2$ is a hydrogen atom or a monovalent organic group. Preferably, $A^2$ is —O—. B is a hydrophilic molecular chain-containing bivalent organic residue obtained by removing from the above-mentioned hydrophilic molecular chain-containing bifunctional polyvalent active hydrogen compound the two $A^2$—H groups, and in some cases, B may be another organic group bonded by $A^2$. Preferably, B is a polyoxyalkylene chain. Particularly, a polyoxyethylene chain represented by the formula $(C_2H_4O)s$ is selected for —B—$A^2$—. Here, as mentioned above, s is an integer of from 1 to 100, preferably from 2 to 30.

The reaction for forming the terminal segments and intermediate segment by using the above-mentioned starting materials, and the reaction for connecting such segments, may be conducted under various reactions conditions by using various apparatus for the reactions. A typical example will be described with reference to a reaction of a fluorine-containing alcohol of the formula $R_f$—X—A—H with a polyfunctional isocyanate compound. The reaction temperature is usually from 0° to 200° C., preferably from 40° to 100° C. The reaction is preferably conducted in an inert organic solvent. However, in some cases, the reaction may be conducted without using an inert organic solvent. Here, the inert organic solvent is preferably the one capable of dissolving the starting material polyfunctional isocyanate compound. For instance, there may be mentioned a halogenated hydrogen carbon such as 1,1,1-trichloroethane, trichloroethylene, trichloromethane or trichlorotrifluoroethane; a hydrocarbon such as benzene, toluene or hexane; an ether such as dioxane, tetrahydrofuran, diethyl ether, dimethoxy ethane or diethylene glycol dimethyl ether; a ketone such as acetone, methyl ethyl ketone or methyl isobutyl ketone; an ester such as ethyl acetate or butyl acetate; dimethylformamide; dimethylsulfoxide; or acetonitrile. The uniform reaction can smoothly be conducted by using such as inert organic solvent. Such an inert organic solvent is used usually in an amount of from 1 to 50 mols, preferably from 5 to 20 mols, per 1 mol of the starting material isocyanate compound.

The above reaction is advantageously conducted substantially in the absence of water to prevent side reactions. Namely, the presence of water is disadvantageous to —NCO groups. For instance, it is desirble to conduct adequate control of moisture in the starting materials or in the apparatus, and to conduct the reaction in an inert gas stream such as dry nitrogen. Such a reaction proceeds smoothly and advantageously in the presence of a catalyst composed of a salt of alkyl tin such as dibutyl tin dilaurate or a compound having a pKa of at least 5.0, preferably from 7 to 10. As such a catalyst, various catalysts may be mentioned, but it is preferred to employ a tertiary amine such as trimethylamine, triethylamine, tripropylamine, tributylamine, triallylamine, N-methylpiperidine, N-methylpyrrolidine, N-methylmorpholine, N-ethylmorpholine, N,N-dimethylbenzylamine, pyridine, 4-methylpyridine, dimethyllaurylamine, dimethylmyristylamine, dimethylstearylamine, tricaprylamine, methyldistearylamine, methyldilaurylamine, dimethylcaprylamine, dimethylpalmitylamine, tetramethylpropylenediamine or pentamethyldiethylenetriamine. Further, an alkali metal alcoholate, inorganic alkali metal salt, inorganic alkaline earth metal salt or ammonium salt having a pKa of at least 5.0, and an inorganic or organic salt of a metal such as tin, cobalt, iron, titanium, zinc, antimony or lead, may also be employed as the catalyst. The amount of the catalyst is usually from 0.001 to 10 parts by weight, preferably from 0.3 to 3 parts by weight, relative to 100 parts by weight of the starting material isocyanate compound.

The terminal segment, the intermediate segment and the $R_f$-urethane compound having the specific structure and molecular weight (hereinafter referred to simply as a specific $R_f$ urethane compound) prepared by the above-mentioned various synthetic routes, are preferably represented by the following formulas. Namely, a preferred example of the specific terminal segment of the present invention is represented by the formula:

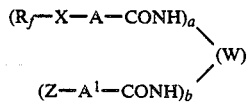

Likewise, the intermediate segment is preferably represented by the formula:

$$-A^2-B-A^2-CONH-Y-NHCO)-$$
$$_m A^2-B-A^2-$$

The specific $R_f$-urethane compound is preferably represented by the formula:

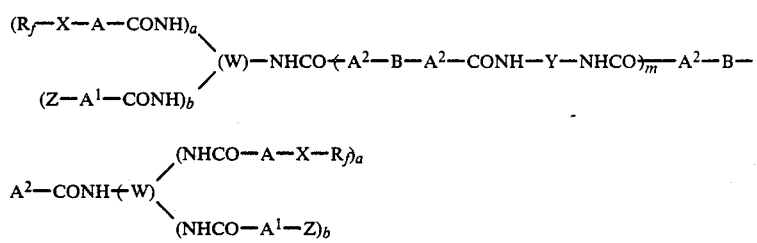

In these formulas, $R_f$, X, Z, A, $A^1$, $A^2$ and B are as defined above. W is a t-valent residue obtained by removing from a t-functional isocyanate compound having t —NCO groups, the t —NCO groups. As mentioned above, a trivalent organic group where t is 3, is preferred. Further, W is preferably a residue derived from an aliphatic polyfunctional isocyanate compound. And, a is an integer of from 1 to 5, b is an integer of from 0 to 4, and a+b is an integer of from 1 to 5. Preferably, a is 1 or 2, b is 0 or 1, and a+b is 2. As mentioned above, Y is preferably a bivalent organic residue obtained by removing from a bifunctional isocyanate compound having two —NCO groups the two —NCO groups, and particularly preferred is a residue derived from an aromatic polyfunctional isocyanate compound. In the formation of the intermediate segment, it is possible to employ a trifunctional polyvalent active hydrogen compound or a trifunctional isocyanate compound. In such a case, B may have other organic group bonded by $A^2$, or Y may have another organic group such as a $R_f$—X—A— group or a Z—$A^1$— group, bonded by a —CONH— group. The symbol m is an integer of from 1 to 50, and it is preferably selected from integers of from 1 to 10.

As the specific $R_f$-urethane compound in the present invention, there may be employed one represented by the above-mentioned preferable formula wherein Y has a hydrophilic molecular chain-containing organic group bonded by a —CONH— group. In this case, as mentioned above, B may not contain a hydrophilic molecular chain. For instance, an organic residue from a trifunctional isocyanate compound is employed as Y. A hydrophilic molecular chain-containing monofunctional active hydrogen compound is reacted to one of the —NCO groups, and a polyvalent active hydrogen compound such as bifunctional H—$A^2$—B—$A^2$—H (in this case, B may not contain a hydrophilic molecular chain) is reacted to the remaining two —NCO groups, whereby a urethane oligomer type intermediate segment is obtainable.

The molecular weight of the specific $R_f$ urethane compound of the present invention having the above-mentioned structure, is usually from 800 to 20,000, preferably from 1,000 to 10,000. If the molecular weight is too small, the water and oil repellency deteriorates remarkably by washing or dry cleaning. On the other hand, if the molecular weight is too high, there will be difficulties such that the initial performance is poor, and the stains once attached are hardly removable.

In the present invention, the specific $R_f$ urethane compound can be used in the form of an organic solution or an organic dispersion. Further, from the viewpoint of the application to a dyeing process or the influence to the working environment, it is particularly advantageous to use it in the form of an aqueous dispersion. In this case, various surfactants such as nonionic, anionic, cationic or amphoteric surfactants, may be employed as the dispersant. These surfactants may be used in combination. Further, an organic solvent may be used together in order to faciliate the dispersion of the specific $R_f$ urethane compound. As the organic solvent to be used in combination for the dispersion into water, there may be mentioned a water soluble ether such as dioxane, tetrahydrofuran or ethyl propyl ether; a water soluble glycol ether such as diethylene glycol dimethyl ether, diethylene glycol diethyl ether, ethylene glycol monomethyl ether, ethylene glycol monoethyl ether, ethylene glycol monopropyl ether, ethylene glycol monobutyl ether, ethylene glycol monophenyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether or triethylene glycol monobutyl ether; an amide such as formamide, dimethylformamide or acetamide; a ketone such as acetone, methyl ethyl ketone, methyl isopropyl ketone, methyl isobutyl ketone or diacetone alcohol; an alcohol such as methanol, ethanol, propanol or butanol; an acetate such as methyl acetate, ethyl acetate, propyl acetate or butyl acetate; and a dibasic acid ester such as diethyl succinate. Such an organic solvent is added usually in an amount of from 10 to 300 parts by weight, preferably from 20 to 150 parts by weight, relative to 100 parts by weight of the specific $R_f$ urethane compound.

When the water and oil repellant of the present invention is in the form of an aqueous dispersion, the concentration of the solid content of the specific $R_f$ urethane compound is not particularly limited, but it is adjusted usually to a level of from 5 to 60% by weight, preferably from 10 to 50% by weight. For the treatment, this dispersion is used in a state diluted with water to a concentration of from 0.4 to 4% by weight. Such an aqueous dispersion type treating agent is advantageous over the organic solvent type in that the flash point of the dispersion is higher, and the concentration of the solid content can be made higher. Further, it has various advantage such that the pollution to the working environment for the treatment can be minimized.

There is no particular restriction as to the articles to be treated by the water and oil repellant of the present invention, and various articles may be mentioned, including fibrous fabrics, glass, paper, wood, leather, fur, asbestos, bricks, cement, metals and their oxides, porcelains, plastics, coated surfaces and plasters. As the fibrous fabrics, fabrics made of animal or plant natural fibers such as cotton, wool or silk; various synthetic fibers such as polyamide, polyester, polyvinyl alcohol, polyacrylonitrile, polyvinyl chloride or polypropylene; semisynthetic fibers such as rayon or acetate; inorganic fibers such as glass fiber or asbestos fiber; or a mixture of these fibers, may be mentioned. Fiber products made of polyamide fiber (nylon) taffeta fine denier and interior articles such as carpets, living room appliances, drapes, wall papers or interior decorations of vehicles, may be mentioned as particularly preferred particles to be treated.

There is no particular restriction as to the manner for the application of the water and oil repellant of the present invention, and well-known or conventional various methods may be employed for the application. For instance, it may be deposited on or absorbed in the surface of the article to be treated, by a known coating method such as dipping, spraying or coating, followed by drying. Further, at the time of the application, various treating agents and additives such as an antistatic agent, an insecticide, a flame retardant, a dyestuff stabilizer and an anti-crease agent, may also be incorporated.

Now, the present invention will be described in further detail with reference to Examples. However, it should be understood that the present invention is by no means restricted by these specific Examples. Unless otherwise specified, "%" and "parts" means "% by weight" and "parts by weight", respectively.

In the following Examples and Comparative Examples, the water repellency and the oil repellency were measured in the following manners. Namely, water repellency-I was evaluated by placing a few drops of an aqueous isopropanol solution having the composition as shown in Table 1, on a sample cloth, and is represented by the point representing the maximum concentration at which the aqueous solution was maintained without soaking into the cloth. The oil repellency was determined by placing a few drops (a diameter of about 4 mm) of the test solution as shown in the following Table 2, on a sample cloth at two locations, and evaluating the infiltration condition upon expiration of 30 seconds (AATCC-TM 118-1966).

TABLE 1

| Water repellency | Isopropanol concentration (% by volume) in an aqueous isopropanol solution |
|---|---|
| 11 | 100 |
| 10 | 90 |
| 9 | 80 |
| 8 | 70 |
| 7 | 60 |
| 6 | 50 |
| 5 | 40 |
| 4 | 30 |
| 3 | 20 |
| 2 | 10 |
| 1 | 0 |
| 0 | Incapable of maintaining water drops |

TABLE 2
(AATCC-TM 118-1966)

| Oil repellency | Test solution | Surface tension dyne/cm, 25 C |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Hexadecane 35/Nujol 65 mixed solution | 29.6 |
| 1 | Nujol | 31.2 |
| 0 | Poorer than 1 | |

For the determination of the stain-proofing property, a sample cloth was cut into a sample of 5×7 cm, and the sample and a dry dust as shown in the following Table 3 (in an amount twice the weight of the sample) were put in a container and vigorously mixed for 3 minutes for staining. After the staining operation, a excess dust was removed by an electric cleaner, and the reflectance was measured to evaluate the staining rate. The staining rate was calculated in accordance with the following equation.

Staining rate $(\%) = (R_1 - R_2)/R_0 \times 100$ where:
$R_0$: reflectance of non-stained cloth
$R_1$: reflectance of stained cloth which was treated
$R_2$: reflectance of stained cloth which was non-treated

TABLE 3

| Dust | % by weight |
|---|---|
| Peat moss | 38 |
| Cement | 17 |
| Kaolin clay | 17 |
| Silica | 17 |
| Carbon black | 1.75 |
| Ferric oxide | 0.50 |
| Mineral oil | 8.75 |

The tests for desoiling properties were conducted as follows. A sample cloth was placed on a blotting paper spread horizontally, five drops of dirty motor oil (SAE 20W-40, an oil discharged from a midget passenger car after a travel for 4,000 km) were dropped thereon, a polyethylene sheet was placed thereon, and a weight of 2 kg was loaded thereon. 60 minutes later, the weight and the polyethylene sheet were removed, the excess oil was wiped off, and the sample cloth was left to stand at room temperature for one hour. Then, the sample cloth and ballast cloth were charged into an electric washing machine with a capacity of 35 liters in a total amount of 1 kg, washed at 50° C. for 10 minutes by using 60 g of a detergent (Super Zab, trade name), rinsed and dried in air. The stained level of the sample cloth was compared with the photographic standards of AATCC Test Method 130-1970 and the desoiling properties of the sample cloth were represented by the corresponding standard level.

TABLE 4

| Desoiling levels | Evaluation Standards |
|---|---|
| 1 | Remarkable stains were observed |
| 2 | Substantial stains were observed |
| 3 | Slight stains were observed |
| 4 | No substantial stains were observed |
| 5 | No stain was observed |

Further, a sample cloth which was not stained by the oil in the above-mentioned test for desoiling properties, was subjected to the same washing treatment as above. The water repellency and oil repellency of the sample cloth after one washing treatment were measured to evaluate the durability against washing.

EXAMPLE 1

Into a 300 ml four necked flask equipped with a stirrer, a dropping funnel, a thermometer and a condenser, 28 g of Sumidur N-3200 (hexamethylenediisocyanate oligomer containing 40% of the trimer, isocyanate content: 22.6%, manufactured by Sumitomo Bayer Co.), 0.02 g of $Bu_2Sn(OCOC_{11}H_{23})_2$ and 103 g of butyl acetate, were charged. While maintaining the temperature at 70° C., 51.4 g of an alcohol of the formula $C_nF_{2n+1}C_2H_4OH$ wherein n is a mixture of 6, 8, 10 and 12, and has an average value of 9.0, was dropwise added over a period of 2 hours by means of the dropping funnel. The stirring was continued for 1 hour, and then 8.71 g of 2,4-tolenediisocyanate and subsequently 15 g of polyethylene glycol having a molecular weight of 200, were added in 5 minutes. The temperature was raised to 90° C., and the reaction was continued for 2 hours, whereby the conversion was 100%. This was confirmed by the disappearance of the alcohol, glycol and isocyanate as ascertained by the gas chromatography, infrared spectrometer and gel permeation chromotography.

The average composition of the reaction product thus obtained, was as follows:

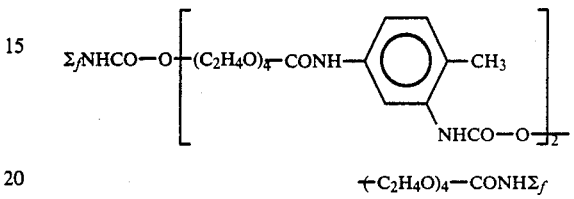

wherein $\Sigma_f$ is $[C_nF_{2n+1}C_2H_4OCONH(CH_2)_6NHCO]_2N(CH_2)_6$.

1.2 g of the solution of this product was diluted to 200 g with a liquid mixture of acetone/trichlorotrifluoroethane (weight ratio of 80/20) to obtain a treating bath. Then, a nylon knitted cloth (20×20 cm) was immersed therein, and then dried at 100° C. for 3 minutes. The treated cloth thus obtained showed an oil repellency of 7, a water repellency of 10 and a stain-proofing rate of 25. This cloth showed a desoiling level of 5, and it showed an oil repellency of 6 and a water repellency of 10 after the washing operation.

EXAMPLES 2 to 5

Various reaction products were prepared in the same manner as in Example 1, and a nylon knitted cloth was treated with each of them. The results are shown in Table 5.

COMPARATIVE EXAMPLES 1 and 2

By using a reaction mixture (Comparative Example 1) of conventional

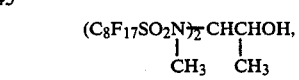

toluenediisocyanate and polyethylene glycol (molecular weight: about 600), the preparation of the treating bath, treatment of the nylon knitted cloth and the measurement of the property were conducted in the same manner as in Example 1. The measurement of the properties of the non-treated cloth (Comparative Example 2) was also conducted. The results are shown in Table 5.

In Table 5, $\Sigma_f$ is $[C_nF_{2n+1}-C_2H_4OCONH(CH_2)_6NHCO]_2-N+CH_2\rightarrow_6$ and $\Sigma_f'$ is

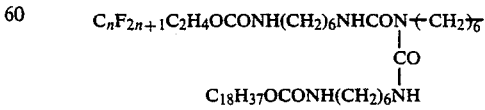

In the case where the level of the desoiling properties is 0, stains not only simply remained, but their size became larger than the original size.

TABLE 5

| | Structure | Oil repellency | Water repellency | Stain Proofing | Desoiling level | After washing Oil repellency | After washing Water repellency |
|---|---|---|---|---|---|---|---|
| Example 2 | $\Sigma_f\text{NHCO}_2\!\!-\!\!\!\left[\!\!\begin{array}{c}\text{CH}_3\\ \text{Ar}\\ \text{NHCO}_2\end{array}\!\!-\!\!(\text{C}_2\text{H}_4\text{O})_{\overline{75}}\text{CONH}\!\!-\!\!\right]_{\!2}\!\!\!(\text{C}_2\text{H}_4\text{O})_{\overline{75}}\text{CONH}\Sigma_f$ | 7 | 10 | 5 | 5 | 6 | 8 |
| Example 3 | $\Sigma_f\text{NHCO}_2\!\!-\!\!\!\left[\!\!\begin{array}{c}\text{CH}_3\\ \text{Ar}\\ \text{NHCO}_2\end{array}\!\!-\!\!(\text{C}_2\text{H}_4\text{O})_{\overline{7}}\text{CONH}\!\!-\!\!\right]_{\!4}\!\!\!(\text{C}_2\text{H}_4\text{O})_{\overline{7}}\text{CONH}\Sigma_f$ | 6 | 10 | 23 | 4 | 6 | 11 |
| Example 4 | $\Sigma_f\text{NHCO}_2(\text{C}_2\text{H}_4\text{O})_{\overline{15}}\text{CONH}\!-\!\text{Ar}\!-\!\text{CH}_2\!-\!\text{Ar}\!-\!\text{NHCO}_2(\text{C}_2\text{H}_4\text{O})_{\overline{15}}\text{CONH}\Sigma_f$ | 7 | 9 | 10 | 5 | 7 | 9 |
| Example 5 | $\Sigma_f\text{NHCO}_2\!\!-\!\!\!\left[\!\!\begin{array}{c}\text{CH}_3\\ \text{Ar}\\ \text{NHCO}_2\end{array}\!\!-\!\!(\text{C}_2\text{H}_4\text{O})_{\overline{7}}\text{CONH}\!\!-\!\!\right]_{\!4}$ | 5 | 11 | 20 | 5 | 5 | 10 |
| Comparative Example 1 | $\begin{array}{l}\text{C}_8\text{H}_{18}\text{SO}_2\text{N}(\text{CH}_3)\text{CHCH}_3\text{OCONH}\!-\!\text{Ar}(\text{CH}_3)\!-\!\text{NHCOOCHCH}(\text{CH}_3)\text{NSO}_2\text{C}_8\text{F}_{17}(\text{CH}_3)\\ \text{C}_8\text{F}_{18}\text{SO}_2\text{N}(\text{CH}_3)\text{CHCOCONH}\!-\!\text{Ar}(\text{CH}_3)\!-\!\text{NHCOO}(\text{C}_2\text{H}_4\text{O})_n\text{CONH}\!-\!\text{Ar}(\text{CH}_3)\!-\!\text{NHCOOCHCH}(\text{CH}_3)\text{NSO}_2\text{C}_8\text{F}_{17}\\ (n\text{ is about }14)\end{array}$ | 5 | 5 | 0 | 4 | 3 | 3 |
| Comparative Example 2 | Non-treated cloth | 0 | 0 | 0 | 0 | 0 | 0 |

EXAMPLE 6

Into a 300 ml four necked flask equipped with a stirrer, a dropping funnel, a thermometer and a condenser, 28 g of Sumidur N-3200 (hexamethylenediisocyanate oligomer containing 40% of the trimer, isocyanate content: 22.6%, manufactured by Sumitomo Bayer Co.), 0.02 g of $Bu_2Sn(OCOC_{11}H_{23})_2$ and 132.2 g of butyl acetate, were charged. While maintaining the temperature at 70° C., 51.4 g of an alcohol of the formula $C_nF_{2n+1}C_2H_4OH$ wherein n is a mixture of 6, 8, 10 and 12, and has an average value of 9, was dropwise added over a period of 2 hours by means of the dropping funnel. The stirring was continued for 1 hour, and then 14 g of the same Sumidur N-3200 as used above and subsequently 10 g of polyethylene glycol having a molecular weight of 200, were added in 5 minutes, respectively. The temperature rose to 83° C. by heat generation, and the stirring was continued for 30 minutes. Then, 28.8 g of $C_{18}H_{37}O(C_2H_4O)_{20}H$ was added thereto. The temperature was raised to 90° C., and the reaction was continued for 2 hours. By the gas chromatography, infrared spectrometer and gel permeation chromatography, the conversion of alcohol, glycol and isocyanate was confirmed to be 100%.

The average composition of the reaction product thus obtained, was as follows:

$$[\Sigma NHCO_2—C_2H_4O)_4O—CONH(CH_2)_6NH-CO]N(CH_2)_6NHCO_2(C_2H_4O)_{20}C_{18}H_{37}$$

wherein $\Sigma_f$ is $[C_nF_{2n+1}C_2H_4OCONH—(CH_2)_6NH-CO]_2N(CH_2)_6$.

1.2 g of the solution of this product was diluted to 200 g with a liquid mixture of acetone/trichlorotrifluoroethane (weight ratio of 80/20) to obtain a treating bath. Then, a nylon knitted cloth (20×20 cm) was immersed in the treating bath, and then dried at 100° C. for 3 minutes. The treated cloth thus obtained, showed an oil repellency of 7, a water repellency of 11, a stain proofing rate of 3.5 and a desoiling level of 5. It showed an oil repellency of 5 and a water repellency of 10 after the washing operation.

EXAMPLES 7 to 9

Various reaction products were prepared in the same manner as in Example 6, and a nylon knitted cloth was treated with each of them. The results are shown in Table 6.

COMPARATIVE EXAMPLES 3 to 4

With respect to compounds having various structures as shown in Table 6, the properties were measured in the same manner as in Example 6. The results are shown in Table 6.

In Table 6, $\Sigma_f$ is $[C_nF_{2n+1}C_2H_4OCONH(CH_2)_6NH-CO]_2${$N-CH_2$}$_6$ and $R_f$ is $C_nF_{2n+1}$.

TABLE 6

| | Structure | Oil repellency | Water repellency | Stain Proofing | Desoiling level | After washing Oil repellency | After washing Water repellency |
|---|---|---|---|---|---|---|---|
| Example 7 | $\Sigma_f NHCO_2-(C_2H_4O)_{75}CONH(CH_2)_6-N\begin{array}{c}\diagup C=O \diagdown \\ N-(CH_2)_6 NHCO_2(C_2H_4O)_{75}CONH\Sigma_f \\ \diagdown C=O \diagup \\ N \\ | \\ (CH_2)_6 \\ | \\ NHCO_2C_{18}H_{37}\end{array}$ | 7 | 10 | 24.3 | 4 | 7 | 10 |
| Example 8 | $\Sigma_f NHCO_2+(C_2H_4O)_4 CONH(CH_2)_6 NHCONCONH(CH_2)_6 NHCO_2\}_7(C_2H_4O)_{75}CONH\Sigma_f$<br>$\quad\quad\quad\quad\quad\quad\quad\quad\quad\quad\quad\quad\quad|$<br>$\quad\quad\quad\quad\quad\quad\quad\quad\quad\quad\quad\quad\quad(CH_2)_6$<br>$\quad\quad\quad\quad\quad\quad\quad\quad\quad\quad\quad\quad\quad NHCO_2C_2H_4R_f$ | 7 | 9 | 17.4 | 4 | 7 | 8 |
| Example 9 | $[\Sigma_f NHCO_2(C_2H_4O)_{75}CONH-\phi-CH_2-\phi-NHCO_2(C_2H_4O)_{20}-C_{18}H_{37}$ | 7 | 11 | 27.3 | 3 | 6 | 9 |
| Comparative Example 3 | $\Sigma_f NHCO_2(C_2H_4O)_{75}CONH\Sigma_f$ | 7 | 3 | 13.0 | 3 | 7 | 4 |
| Comparative Example 4 | $\Sigma_f NHCO_2(C_2H_4O)_{20}-C_{18}H_{37}$ | 7 | 4 | 2.0 | 5 | 5 | 2 |

EXAMPLE 10

100 parts of a fluorine-containing urethane oligomer having the same average composition as the reaction product in Example 1 and 50 parts of diethyl succinate as a solvent were heated to 85° C. and molten, and 6.5 parts of Newcol 780 (Nonion type emulsifier, Nippon Nyukazai K.K.) heated to 85° C. and 283 parts of an aqueous solution containing 1.28 parts of NIKKOL ECT-3NEX (Anion type emulsifier, manufactured by Nikko Chemicals were added thereto, the mixture was stirred by a homomixer for one minute and then treated by a high pressure homogenizer (APV, manufactured by CAULIN) at 80° C. under a pressure of 470 atm, thereafter the treated mixture was rapidly cooled to room temperature. As a result, a stable milk white emulsion was obtained.

The emulsion thus obtained was diluted with deionized water, a polyester knitted cloth was immersed therein, and then excess liquid with squeezed from the cloth so that an emulsion having a solid concentration of 0.2% by weight was adhered. Then, the cloth was dried at 100° C. for three minutes, and heat-treated at 120° C. for three minutes. The treated cloth was stirred in hot water of 130° C. for 45 minutes by an autoclave, and then washed in hot water of 40° C. for 10 minutes by a wash cylinder. After the dehydration, the cloth was dried at 90° C. for three minutes. The treated cloth thus obtained showed an oil repellency of 6, a water repellency of 10, a stain proofing rate of 25 and a desoiling level of 4. Further, it shows an oil repellency of 6 and a water repellency of 10 after washing.

EXAMPLE 11

The treated cloth obtained in the same manner as in Example 10 except that Newcol 560SF (Anion type emulsifier, manufactured by Nippon Nyukazai K.K.) was used instead of NIKKOL ECT-3NEX, showed an oil repellency of 6, a water repellency of 10, a stain proofing rate of 25 and a desoiling level of 4. Further, it showed an oil repellency of 6 and a water repellency of 10 after washing.

The water and oil repellant of the present invention has high water and oil repellency such that stains with hardly adhere and excellent desoiling properties such that stains once adhered will readily be removed during washing. Namely, there is the effect that it is capable of providing desoiling properties compatibly with high water and oil repellency. Particularly, it exhibits high performance water repellency and an excellent effect that dusts or aqueous stains hardly adhere which are hardly obtainable by a conventional water and oil repellant capable of providing desoiling properties.

We claim:

1. A water and oil repellant having excellent desoiling properties composed of a compound comprising at least two terminal segments and an intermediate segment connecting the terminal segments and having a molecular weight of from 800 to 20,000, each terminal segment containing at least one polyfluoroalkyl group connected by a —CONH— linking group, said intermediate segment being a urethane oligomer containing at least two —CONH— linking groups and a hydrophilic molecular chain, and said terminal segments and intermediate segment being connected by an additional —CONH— linking group, wherein the compound having a molecular weight of from 800 to 20,000 is a compound having the formula:

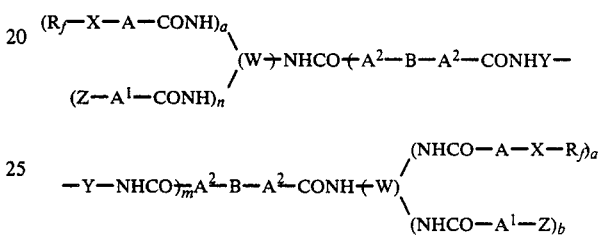

wherein $R_f$ is a perfluoroalkyl group of the formula $C_nF_{2n+1}$, X is —R—, $CON(R^1)$—Q— or —$SO_2N(R^1)$—Q—, each of A, $A^1$ and $A^2$ is —O—, —S— or —$N(R^2)$, Z is a monovalent organic group, a is an integer of from 1 to 5, b is an integer of from 0 to 4, a+b is an integer of from 1 to 5, W is a t-valent organic residue obtained by removing the t —NCO groups from a t-functional isocyanate compound having t —NCO groups, wherein t is an integer of a+b+1, B is a bivalent organic residue obtained by removing the two —$A^2$—H groups from a hydrophilic molecular chain-containing bifunctional polyvalent active hydrogen compound, provided B may have another organic group bonded by $A^2$, Y is a bivalent organic residue obtained by removing the two —NCO groups from a bifunctional isocyanate compound, provided Y may have another organic group bonded by a —NHCO— group, m is an integer of from 1 to 50, r is a bivalent alkylene group, $R^1$ is hydrogen atom or a lower alkyl group, Q is a bivalent alkylene group, $R^2$ is a hydrogen atom or a monovalent organic group, or Z and $R^2$ may form a ring.

* * * * *

UNITED STATES PATENT AND TRADEMARK OFFICE
CERTIFICATE OF CORRECTION

PATENT NO. : 4,792,354

DATED : Dec. 20, 1988

INVENTOR(S) : Masashi Matsuo et al.

It is certified that error appears in the above-identified patent and that said Letters Patent is hereby corrected as shown below:

On the Title Page, Item [30]:

The Foreign Application Priority Data should be corrected to read as follows:

-- Feb. 5, 1986 [JP] Japan .................... 61-22127 --

Signed and Sealed this

Twentieth Day of June, 1989

Attest:

DONALD J. QUIGG

Attesting Officer

Commissioner of Patents and Trademarks